United States Patent
Hu et al.

(10) Patent No.: US 8,051,161 B2
(45) Date of Patent: Nov. 1, 2011

(54) PEER-TO-PEER (P2P) STREAMING OVERLAY CONSTRUCTION AND OPTIMIZATION

(75) Inventors: Yusuo Hu, Beijing (CN); Jiang Li, Beijing (CN); Jian-guang Lou, Beijing (CN); Qingwei Lin, Redmond, WA (US); Fan Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 12/330,236

(22) Filed: Dec. 8, 2008

(65) Prior Publication Data

US 2010/0146092 A1    Jun. 10, 2010

(51) Int. Cl.
   G06F 15/173   (2006.01)
   G06F 15/16    (2006.01)
(52) U.S. Cl. .................. 709/223; 709/228; 709/238
(58) Field of Classification Search .................. None
   See application file for complete search history.

(56) References Cited

U.S. PATENT DOCUMENTS

| 6,205,140 | B1 | 3/2001 | Putzolu et al. |
| 7,065,579 | B2 * | 6/2006 | Traversat et al. ............ 709/230 |
| 7,143,139 | B2 * | 11/2006 | Burbeck et al. .............. 709/206 |
| 2006/0126527 | A1 | 6/2006 | Cheung et al. |
| 2006/0200251 | A1 | 9/2006 | Gu et al. |
| 2006/0224668 | A1 | 10/2006 | Ginis |
| 2007/0086366 | A1 | 4/2007 | Luo et al. |
| 2007/0280255 | A1 | 12/2007 | Tsang et al. |
| 2008/0112315 | A1 | 5/2008 | Hu et al. |
| 2010/0030909 | A1 * | 2/2010 | Magharei et al. ............ 709/231 |

FOREIGN PATENT DOCUMENTS

WO    WO2008066560 A1    6/2008

OTHER PUBLICATIONS

Liao, et al., "AnySee: Peer-to-Peer Live Streaming", retrieved on Oct. 23, 2008 at <<http://grid.hust.edu.cn/chengbin/resource/papers/AnySee.pdf>>, IEEE INFOCOM 2006 (10.1109/INFOCOM.2006.288), 2006, pp. 1-10.

Tang, et al., "Live Video Streaming Service over Peer to Peer Network: Design, Implementation and Experience", retrieved on Oct. 23, 2008 at <<http://paper.ijcsns.org/07_book/200603/200603B10.pdf>>, IJCSNS, vol. 6, No. 3B, 2006, pp. 77-86.

(Continued)

Primary Examiner — John B. Walsh
(74) Attorney, Agent, or Firm — Lee & Hayes, PLLC

(57) ABSTRACT

This document describes a directed graph model using a peer-to-peer overlay structure and a gossip-based protocol to maintain the distributed membership. A protocol suite for peers to join the live streaming session, form the P2P streaming overlay, and exchange video packets with others has also been presented. The different capabilities of the heterogeneous peers are well depicted using an adaptive out-degree mechanism. The performance of the whole system is maintained by a contribution-aware mechanism, which ensures that the peers with large contribution will get more chance to be served than those with small or no contribution.

20 Claims, 5 Drawing Sheets

OTHER PUBLICATIONS

Xiang, et al., "Peer-to-Peer based Multimedia Distribution Service", retrieved on Oct. 23, 2008 at <<http://nsl.cs.surrey.sfu.ca/nrg/papers/XZZZ04.pdf>>, IEEE Transactions on Multimedia (1520-9210/04), vol. 6, No. 2, 2004, pp. 343-355.

Zhang, et al., "Large-Scale Live Media Streaming over Peer-to-Peer Networks through Global Internet", retrieved on Oct. 23, 2008 at <<http://media.cs.tsinghua.edu.cn/~zhangm/publications/acm_p2pmms05.pdf>>, ACM P2PMMS'05 (1-59593-248-8/05/0011), 2005, pp. 21-28.

Wu, et al., "Strategies of Conflict in Coexisting Streaming Overlays", retrieved on Oct. 23, 2008 at <<http://www.eecg.toronto.edu/~bli/papers/cwu-infocom07.pdf>>, IEEE INFOCOM 2007 (10.1109/INFCOM.2007.63 ), May 2007, pp. 481-489.

* cited by examiner

PEER-TO-PEER (P2P) STREAMING OVERLAY CONSTRUCTION AND OPTIMIZATION

BACKGROUND

Peer-to-peer networking has proven to be a promising method for delivering live video streams and other content to a large number of clients over the Internet. Much effort has been devoted to the research and development of these live peer-to-peer streaming systems. Some deployed systems have shown that the peer-to-peer systems can scale to millions of online users in a single session.

In the design of the peer-to-peer streaming systems, one of the most important problems to address is how to organize the dynamic and heterogeneous peers into an efficient overlay. The structure and behavior of the overlay greatly affects the efficiency of many modules such as peer discovery, data transmission, and the final streaming performance perceived by end users.

Mesh-based and tree-based approaches are the two common methods for overlay construction in peer-to-peer streaming systems.

In the tree-based approach, peers or nodes (peers and nodes are used interchangeably throughout this document) form one or multiple trees to disseminate the streaming packets. Within each tree, the node receives packets from its parent nodes and delivers their copies to its child nodes. Multiple trees are usually disjointed, i.e., each node is an interior node of one tree and the leaf node of all the other trees. However, the tree is not robust to peer churn, since it requires high cost in repairing the tree structure when peers are joining and leaving the session frequently.

In the mesh-based approach, peers are organized in a more unstructured way. There is no explicit tree structure over the peers. Instead, peers simply find a number of other nodes as their partners and exchange data with them according to their available packets. Some research work has shown that the mesh-based approach is more robust and efficient than the tree-based one when delivering live video. Consequently, most deployed peer-to-peer streaming systems use mesh-based approaches.

However, current mesh-based approaches use a randomly constructed overlay to organize the peers for transmitting video, otherwise known as an undirected graph approach. Due to this undirected graph approach, it is difficult to describe the relationship between peers, the heterogeneity in the capability of the peers and the ability to optimize the overlay. As such, previous mesh-based and tree-based approaches are either not flexible or not robust enough for providing satisfactory performance.

SUMMARY

A novel approach for constructing a P2P streaming overlay is described herein using a directed graph model to describe and organize the heterogeneous peers into a dynamic overlay. Based on this model, a set of efficient protocols and algorithms is developed for overlay construction and optimization. The protocols and algorithms in the directed graph model primarily comprise a membership protocol for providing a peer with a mechanism to join a session and an overlay construction and optimization module which provides algorithms to enhance data flow among the peers. This is accomplished using a parent-child protocol where two peers can both be parents of each other. In fact, peer can be any combination of parent and child in this model, thus aiding significantly the ability to exchange and pass information among the peers.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

This document describes a directed graph P2P streaming model. In this model, a source video server continuously generates streaming packets and delivers those packets to its children peers. All the other peers cooperate and exchange the video packets among one another. A bootstrap server is also deployed to help a new peer join the streaming session. A membership protocol is used when a peer first joins a session and an overlay construction and optimization module is used to enhance data flow among the peers.

This directed graph model has several advantages. First, the model is general enough to describe the overlay topology. In this model, two peers can be the parent nodes of each other, thus they can bilaterally exchange streaming data packets whenever possible.

Under the directed graph model, it is also more convenient to capture the heterogeneity in peer capabilities. End hosts on the Internet often have heterogeneous access bandwidths, processing power and the like. Furthermore, in many applications, such as asymmetric digital subscriber line (ADSL), users are connecting to the Internet via an asymmetric ADSL for uploading and downloading bandwidths. The incoming and outgoing degree of the directed graph can describe such heterogeneity very well.

Finally, the explicit parent-child relationship utilized in the directed graph model can precisely describe the data flow in the streaming overlay. Therefore, the directed P2P graph can be optimized to achieve the desired performance more easily. For example, a contribution-aware mechanism can be used to ensure that peers with higher bandwidths will get better streaming quality. As a result, the quality of service (QoS) of the P2P streaming system is much improved.

The graph in the directed graph P2P streaming model consists of the streaming source node or content server and a number of other nodes representing the peers that participate in the same streaming session.

Illustrative Architecture

Figure 1:
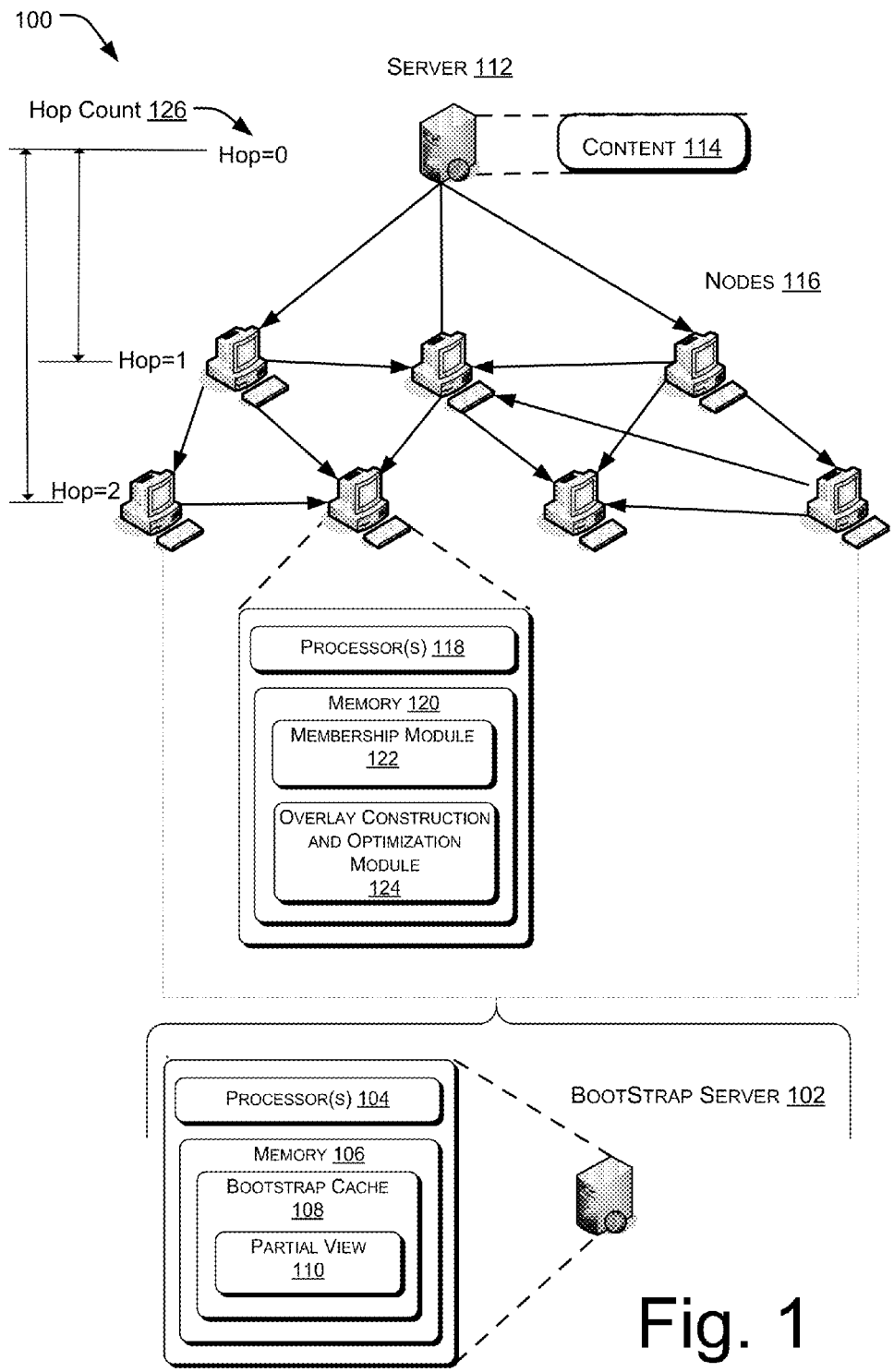
FIG. 1 depicts an illustrative architecture that implements a peer-to-peer streaming overlay construction and optimization model.

FIG. 1 depicts an illustrative peer-to-peer architecture 100 that may employ the directed graph techniques, also called parent-child techniques. As illustrated, FIG. 1 includes a bootstrap server 102 that contains one or more processors 104, memory 106 and a bootstrap cache 108. The bootstrap cache 108 stores a partial view of the overlay 110. The partial view information consists of peer records for each of the nodes 116. The bootstrap server 102, also referred to as a bootstrap node, is deployed as the entry point of the P2P streaming session. Each peer typically contacts this server to join the session.

As illustrated architecture 100 also includes a content server 106 that contains content 114 and is also referred to as the source node in the session. Nodes or peers 116 also participate in the session. Each node 116, such as node 116(1), contains one or more processors 118, memory 120, a membership module 122 and an overlay construction and optimization module 124.

The membership module 122 resides on each of the peers 116 and describes the process in which the various peers 116 can join a session and the information that is recorded by each of the peers 116 and the bootstrap server 102.

The overlay construction and optimization module 124 also resides on each of the peers 116 and defines the process for data exchange between the peers and also for replacing and discarding peers 116.

The server 112 and nodes 116 participate in the streaming overlay. However, the bootstrap server 102 typically does not participate in the streaming overlay. The streaming overlay is comprised of various levels and each level in the session is assigned a hop count 126. The hop count 126 represents the directed distance from the source node 112 to the peer 116, i.e. the length of the shortest path which consists of a number of consecutive directed arcs from the source to the peer. FIG. 1 shows that the hop count for the node server 112 is zero. The shortest path to the first row of peers 116 in FIG. 1 is represented by hop count=1. The hop count=2 for the shortest path to the second row of peers 116 in FIG. 1. As will be described later, the hop count 126 is contained in the peer record information as part of the membership module and that information is used for sorting purposes in the overlay construction and optimization module. The hop count of peer p, H(p), is defined as follows:

$$H(r) = 0;$$
$$H(p) = \min_{q: q \to p} H(q) + 1, \forall\, p \neq r$$

In other words, the hop count of the source node r is always 0, and the hop count of the peer p is the length of the shortest path from r to p on the directed graph. Since the bootstrap server 102 does not participate in the streaming overlay, its hop count is set to $H_\infty$.

Figure 2:
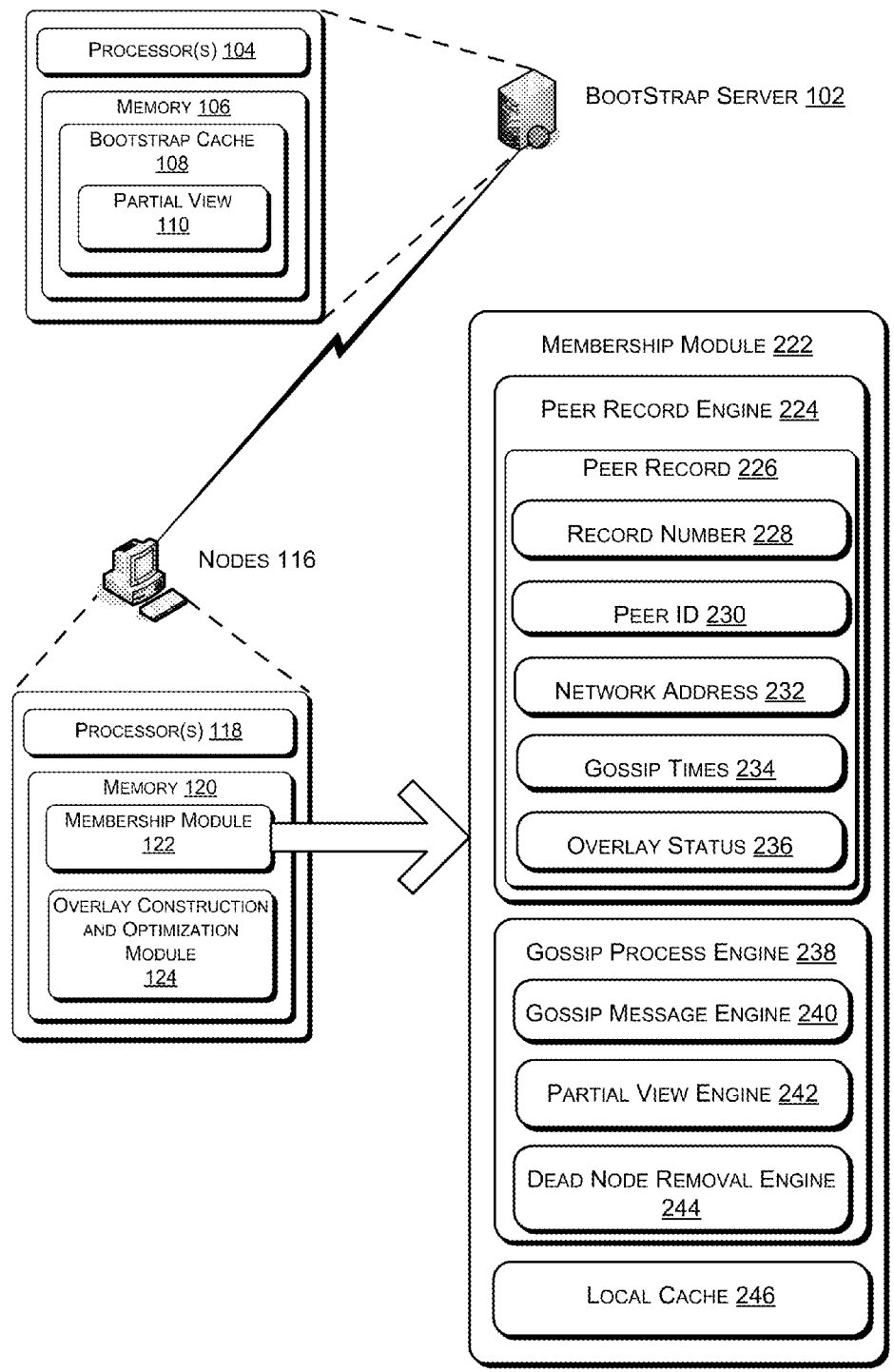
FIG. 2 depicts a membership module of a peer of FIG. 1 in more detail.

FIG. 2 depicts the details of the membership module identified in FIG. 1. As before, the bootstrap server 102 contains one or more processors 104, memory 106, a bootstrap cache 108. The bootstrap cache 108 contains a partial view of the overlay 110 and is in communication with the nodes 116, such as node 116(1). Node 116(1) contains one or more processors 118, memory 120, a membership module 122 and an overlay construction and optimization module 124.

For a particular peer 116(1), a membership module 222 is described and provides a mechanism for a peer 116(1) to join a session. If a peer 116(1) is new to the session, the membership module 222 begins by contacting the bootstrap node or server 102. As such, the bootstrap server 102 is the entry point of the P2P streaming session. However, if the peer 116(1) is already a member of the session, then peer 116 can initiate the membership module 222 without going through the bootstrap server 102 and can contact another peer directly. Each peer 116(1), including the bootstrap server 102, maintains a partial view of the overlay. The partial view of the overlay contains peer record information and is more fully described later in this document.

The membership module 222 contains a peer record engine 224 for generating a peer record 226. The partial view of the overlay consists of a number of peer records 226. The maximum size of the partial view of a peer 116(1) is set to be a predefined value. The maximum size of the partial view of the bootstrap server 102 can be larger than the peers 116. In an illustrative embodiment, the maximum size of the partial view of a peer 116(1) is set to twenty and the maximum size of the partial view of the bootstrap server 102 is set to 100. Peers 116 periodically exchange their partial view information to update their membership information, both with the peers 116 and the bootstrap server 102.

The peer record engine 224 periodically generates a peer record 226 for each peer 116(1) to describe its current status. The peer record 226 contains a number of pieces of information. For instance, the peer record 226 may include a record number 228, a peer ID 230, a network address 232, one or more gossip times 234 and an overlay status 236. The first piece is the record number 228. The record number 228 uniquely identifies a particular record originated from the same source peer. In this arrangement, the newer record has a larger record number. The second piece of information in the peer record 226 is the peer ID 230. Each peer has a unique ID. The peer ID 230 can be a 128-bit UUID generated by the OS or an ID generated by any other method that provides a robust ID. The peer record 226 also includes a network address 232. The network address 232 of a peer 116(1) may be its internet protocol (IP) address, port or other address information that provides other peers with the ability to contact this peer through. The peer record 226 also includes the gossip times 234. Gossip times 234 are the number of times that this peer record 226 been relayed through the gossip message (described in detail below). Finally, the peer record 226 includes the overlay status 236. The overlay status is the status of the peer 116(1) in the streaming overlay, including current hop count of the peer, the current in degree and out degree of the peer, the max in and max out degree of the peer, and any other similar information.

To join the session, a new peer 116 first contacts the bootstrap server 102 and the bootstrap server 102 selects a number of nodes 116 randomly from its own partial view and sends them to the new peer 116. The peer 116 then adds the received peer records 226 to its own partial view and starts the gossip process engine 238. The bootstrap server 102 will add the new peer 116 into the partial view. If the addition of the new peer 116 causes the bootstrap server 102 to exceed the maximum size of the partial view, the bootstrap server 102 will randomly remove one node 116 from the partial view of the bootstrap server 102.

The gossip process engine 238 is an epidemic style gossip process to help peers 116 join the session and disseminate the membership information. The process is very efficient and robust to peer failure. Each peer 116(1), including the bootstrap server 102, runs a gossip process engine such as the gossip process engine 238. The gossip process engine 238 begins with a gossip message engine 240, which generates a gossip message. For each time period τ, each peer 116(1)

randomly chooses one target peer from the partial view and tries to contact the target peer. If the peer successfully connects with the target peer, these two peers will send a gossip message from the gossip message engine 234 to each other. The gossip message 238 includes the partial views of the respective peers. In one implementation, the time period τ is set to τ=2 s. To prevent the peer overlay from separation, each peer is allowed to gossip with the bootstrap node 102 with a small probability $P_{bs}$ where $P_{bs}$=0.01 in one implementation.

The partial view engine 242 executes when one peer receives the gossip message 238 from another peer. In this instance, the peer will merge the remote partial view with its local partial view according to a set of rules. For each record in the remote partial view, the record is added if the corresponding peer is not present in the local partial view. If a record exists which originated from the same peer in the local view but its sequence number is smaller, then the local record is replaced with the remote record. If the remote peer record is marked as a "dead node," the local peer record will be marked as dead and the overlay module will be notified. In the event the merged cache resulting from the record additions exceed the pre-defined threshold, the records are sorted in the partial view by their gossip times in an ascending order and the view is truncated to the desired size by removing the records at the bottom of the sorted list.

A dead node removal engine 244 completes the gossip process engine 244. The resulting partial views are stored in a bootstrap cache 108 in the bootstrap server 102 and a local cache 246 on each peer.

A more detailed description of the dead node removal engine 244 is described below. Because the peers are frequently joining and leaving the overlay, some records in the cache will become "dead records" when the corresponding peers have quit the session. These "dead records" will affect the performance of the streaming overlay. Therefore, the dead nodes should be removed as quickly as possible. The dead node removal engine 244 is accomplished by setting a time-to-live (TTL) value for each record in the partial view. If the record is not updated for a longer time than the TTL, the node will be removed from the local cache 246. A MAX_GOSSIP_TIMES threshold is also set. When the gossip times of a record exceed the MAX_GOSSIP_TIMES threshold, that record will also be removed from the cache.

Each peer may also send a PEER_QUIT message to all the other peers in its own partial view when the peer quits the overlay elegantly. And when a peer receives a PEER_QUIT message from another peer, it will mark the quitted peer as dead. The dead peer record will be kept in the local cache 246 for some time until the TTL for that record has expired. And when exchanging gossip messages, the dead peer record will also be disseminated to other peers, so that the other peer will also know that the peer is dead. The dead peers are assigned extremely large gossip times (larger than MAX_GOSSIP_TIMES). Therefore, when merging the partial view, the dead peers will become the last peers listed in the partial view and may be truncated out if the merged partial view has exceeded the maximum size threshold.

When a peer selects another target peer from the local partial view and initiates a gossip process 238 with the target peer, the peer may sometimes fail to connect with the target peer. In this case, the target peer record will not be marked as dead in the local cache 246 and disseminated to others, because the failed connection may be caused by some connectivity issue such as a firewall, etc (i.e., for reasons other than the target peer being "dead"). Instead, the peer may simply remove the target peer from the local partial view.

Returning now to the bootstrap cache 108 and the local cache 246, because the membership module 222 maintains a number of peer records 226 and periodically updates them, the membership module 222 enables the upper overlay module to discover other peers and get the updated peer information in the current session.

The bootstrap server 102 will try to cache a number of underloaded nodes as the potential parent candidates for new peers. To do that, the bootstrap server maintains a cache in its memory named a bootstrap cache 108. During the gossip process 238 when the bootstrap server 102 finds a new peer which is underloaded (i.e. the peer has some free outgoing links), the bootstrap server 102 will put that peer record 226 into the bootstrap cache 108. The peer record 226 in the bootstrap cache 108 will be removed either when the bootstrap server 102 finds that the peer is no longer underloaded, or the record's TTL has expired (i.e. that record has not been updated for a long time).

After joining the session, each peer also needs to cache a number of underloaded nodes as its parent candidates. Therefore, each peer maintains a local cache 246 in its memory 120. During the gossip process 238, when a peer finds another peer which is underloaded, it will put that peer record into the local cache 246. The peer record 226 in the local cache 246 will be removed either when the peer finds that the cached peer is no longer underloaded, or the record's TTL has expired (i.e. that record has not been updated for a long time).

Figure 3:
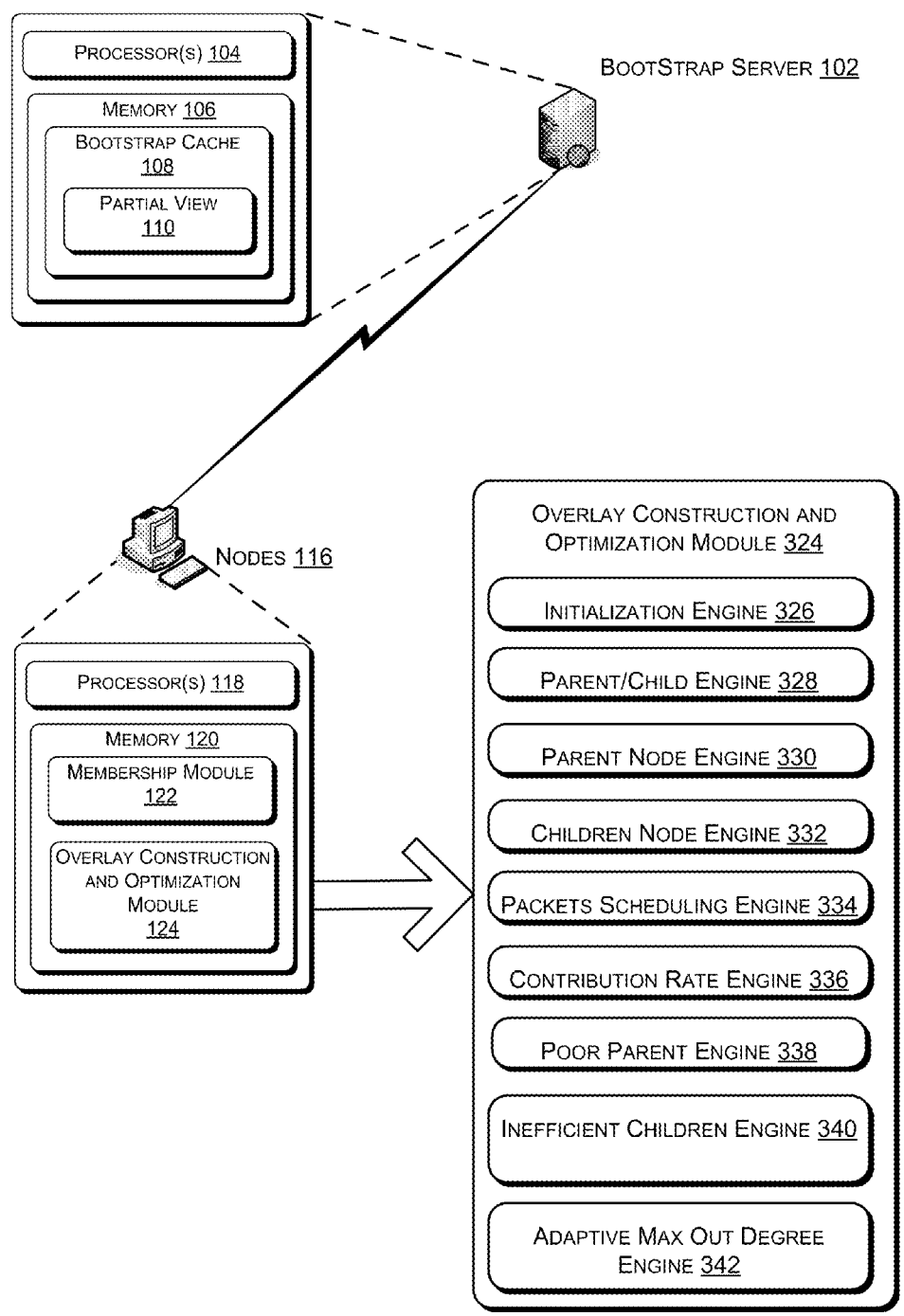
FIG. 3 depicts a overlay construction and optimization module of the peer of FIG. 1 in more detail.

FIG. 3 depicts the details of the overlay construction and optimization module identified in FIG. 1. Once again, the bootstrap server 102 contains one or more processors 104, memory 106 and a bootstrap cache 108. The bootstrap cache 108 contains a partial view of the overlay 110 and communicates with the nodes 116. Each of the nodes 116 contains one or more processors 118, memory 120, a membership module 122 and an overlay construction and optimization module 124.

The overlay construction and optimization module 324 is one example of a overlay construction and optimization module 124 for an individual peer 116. The overlay construction and optimization module 324 begins with initialization engine 324 of a peer 116. The initialization engine 324 sets various in-degree and out-degree settings. Initially, both the peer's in-degree and out-degree are set to zero. The number of a peer's parents is defined as its in-degree, and the number of a peer's children is defined as its out-degree. The initial max in-degree is set to be a constant $K_{in}$. The initial max out-degree is equal to the max in-degree. The peer's initial overlay hop count is set to $H_\infty$.

To describe the different capability of the peers, some constraints on each node's incoming and outgoing degrees are set. Each peer has a maximum out-degree $K_{out}(p)$, which stands for the maximal number of child nodes that it can support. Meanwhile, each node has a max in-degree $K_{in}(p)$, which stands for the maximal number of parents it will try to find.

In the P2P streaming overlay, since each peer 116(1) will receive a video stream with constant bit-rate, the max in-degree of non-root peers is set to a constant value $K_{in}$. However, the max out-degree $K_{out}(p)$ of each peer p needs to be determined by its own capability, particularly its uploading bandwidth. An adaptive method, described in more detail below, is used to adjust the peer's max out-degree in this P2P system. The video source node is the root of the whole directed graph, which has only outgoing links. Therefore, its max in-degree is always zero and its max out-degree is set to be a predefined constant value, which is decided by its outgoing bandwidth.

The overlay construction and optimization module 324 depends on a parent-child protocol 328. The parent-child relationship is defined as a directed arc from peer p to peer q to represent that the peer p is the "parent" of the peer q and the peer q is the child of the peer p. This is denoted by the expression p→q. There should be no duplicate arc with the same direction between two nodes. However, there may be two opposite directed arcs between two nodes. That is, two nodes can both be the parents of each other. In the P2P streaming session, each peer 116 will try to find several other peers as its parents and request streaming data from them. Meanwhile, a peer can also be the parent node of other peers and deliver video data to them.

In the parent-child engine 328, when a peer (subscribing peer) wants to add another or later peer (requested peer) as its parent, the peer will first send a SUBSCRIBE message to the requested peer. The requested peer checks its own status and decides whether to accept or decline this subscribe request. If the subscribe request is accepted, the requested peer will send back a SUBSCRIBE_ACCEPT message, add the subscribing peer as its child peer, and increase its out-degree by one. After receiving the SUBSCRIBE_ACCEPT message, the subscribing peer will add the requested node as a parent peer and increase its out-degree by one.

When a peer 116 wants to replace one of its parent nodes with some other better parent candidate, it may send an UNSUBSRIBE message to the parent node and decrease its in-degree by one. After receiving the unsubscribe message, the parent peer will remove the child node and decrease its out degree by one. When necessary, a parent node can also one remove one of its child nodes by sending a DISCARD message to it and decrease its out degree. After receiving the discard message, the child peer will remove the parent peer and decrease its in-degree.

Each peer 116 keeps alive all its parent nodes and child nodes by sending HEARTBEAT messages to them every few seconds. If the heartbeat message of some parent/child node is timed out, the peer 116 will think the node has left the overlay. The peer 116 will then remove the parent/child node and decrease its in-degree and out-degree respectively.

The overlay construction and optimization protocol 324 next employs a parent node engine 330 for finding parent nodes. After joining the overlay, the new peer 116 will send a query message to the bootstrap node 102. The bootstrap node 102 selects a number of underloaded nodes randomly from the bootstrap cache 108 and sends them back to the new peer 116. The new peer 116 will fill its own local cache with these nodes. Later, the new peer 116 will get the underloaded nodes from its own local cache. Underloaded is defined as a peer having an out-degree that is smaller than its max out-degree. Similarly, overloaded is defined as a peer having a max out-degree that is larger than its out-degree.

Periodically, each peer 116 will check the number of its parents and calculate the current required parent number as follows $$d_r(p) = K_{in} - d(p) + d_p(p)$$

Where $K_{in}$ is the max in degree, $d(p)$ is the peer's current in degree, and $d_p(p)$ is the current number of p's poor parents. A poor parent node is defined as a parent node having a throughput less than a threshold. The peer will then select $d_r(p)$ parent candidates from its local cache and try to add them as parents. The peer records in the local cache are sorted by their overlap hop count in ascending order. The first $d_r(p)$ peers will be selected as the parent candidates. With a small probability, the peer will also select a random node from the local cache as the parent candidate. If the peer cannot get enough parent candidates from the local cache over a predetermined period of time, it will contact the bootstrap node 102 again to query for some parent candidates. After the selection procedure has been completed, the peer 116 will send SUBSCRIBE messages to the parent candidates to request they become its parent nodes.

A children node engine 332 is provided for accepting children nodes and occurs when a peer q receives the subscribe request from peer p. In the event this occurs, it will use the algorithm described herein to decide whether to accept or decline this subscribe request. In this procedure, the peer q first checks whether it has any parent ($H(q)=H_\infty$?). If peer q has no parent yet, it will simply decline peer p's request. Otherwise, it will continue to check its children's status.

If peer q is currently underloaded, it will accept the peer p as a child node immediately. Otherwise, it will adopt a contribution-aware strategy to handle peer p's request.

Each peer also has a contribution rate. The contribution rate used to describe how many packets the peer has delivered to other peers during the recent transmission process. For each peer p, the initial contribution rate is set to be zero. At the end of each scheduling round, the contribution rate C(p) is updated as follows:

$$C(p) = \alpha C(p) + (1 - \alpha) \sum_{q: p \to q} T(p, q)$$

where T(p,q) is the number of packets sent by p to its child peer q during last round, and α is a smoothing constant ranging in (0,1). The peer q first checks the contribution rates of its children and selects the child u which has the least contribution rate during the last $T_c$ scheduling rounds. If u's contribution is less than a threshold $C_{min}$, q will discard the child u and replace it with p, otherwise, q will decline p's request. The threshold for the minimum contribution rate $C_{min}$ is decided by the source video packet rate R and maximum in-degree $K_{in}$. We use the following equation to calculate $C_{min}$.

$$C_{min} = b \cdot \frac{R}{K_{in}}$$

Where, b is a small constant. We take b=1 in our implementation.

Packets scheduling engine 334 uses a pull-based method to exchange video packets among peers. The transmission procedure is arranged in scheduling rounds. Each scheduling round lasts $T_s$ seconds. The live video is composed of a sequence of data packets. Every video packet has a sequence number to represent its location in the video stream. Each peer buffers a short period of video packets in a first-in, first-out (FIFO) queue with a fixed length. A bit vector, named buffer map, is used to describe the buffer status. The length of the bit vector is fixed and each bit in the vector represents the availability of the corresponding packet in the buffer. The maximum sequence number of the buffer is also recorded and transmitted with the buffer map.

Each peer periodically broadcasts its buffer map to all of its children to notify its current buffer status. According to the received buffer maps and its own buffer status, the child node schedules the missing packets to be pulled from its parents through some packet scheduling strategy. If two nodes are both the parent and child of each other, they will exchange their buffer maps as well as video packets.

The parent peer publishes its buffer map to its children for every $T_s/2$ seconds so that the children will get the update of their parents' buffer status for at least once within each scheduling round.

For every $T_s$ second, each peer will schedule the packets which are missing in its cache according to the parents' buffer status and current available bandwidth using an intelligent packet scheduling algorithm. After scheduling, it will send a PULL message to its parent, which consists of a bit vector indicating the required packets. After receiving the pull message, the parent starts sending the required packets to the child immediately.

The contribution rate engine 336 generates a contribution rate as described briefly above. The contribution rate is used to describe how many packets the peer has delivered to other peers during the recent transmission process. For each peer p, the initial contribution rate is set to zero. At the end of each scheduling round, the contribution rate C(p) is updated as follows:

$$C(p) = \alpha C(p) + (1-\alpha) \sum_{q: p \to q} T(p,q)$$

where T(p,q) is the number of packets sent by p to its child peer q during last round, and $\alpha$ is a smoothing constant ranging in (0,1).

Each peer will calculate its own contribution rate in each scheduling round and send it to its parent. The contribution rate information can be piggybacked on the parent along with the pull message. The parents will then adopt the contribution-aware strategy to adjust its children peers according to their contribution rates.

The poor parent engine 338 identifies those poor parents that need to be replaced. During the packets scheduling engine 334 operation, the peer measures the incoming data throughput from each parent node. If the peer finds one of its parents has a throughput less than a threshold, it will mark that parent as a "poor" parent. It will also send a POOR message to indicate that parent node and try to find another peer to replace the poor parent through the parent node engine 330 process. Once another parent node has been found, the poor parent will be removed from the partial view information on the peer's local cache.

To fully utilize the peer's out-going bandwidth on each outgoing link, each peer will also monitor the outgoing data throughput to each child in the inefficient children engine 340. The inefficient children engine 340 identifies those children that need to be replaced. If a child has not pulled any data from the link for more than a predetermined number of rounds, it will send a DISCARD message to that child and remove the discarded child peer.

In order to increase efficiency and performance, an adaptive max-out degree engine 342 is used. The initial max out-degree $K_{out}(p)$ is set as the same value as the max in-degree $K_{in}$. After joining the overlay, the peer p will adjust $K_{out}(p)$ adapting to p's outgoing bandwidth.

A peer p will decrease or increase its max out-degree $K_{out}(p)$ when either of the following criteria is satisfied. First, consider a degree increase. Suppose a peer has served $K_{out}(p)$ children for a time period $T_d$. During this period, if it has not received any unsubscribe or poor throughput indication message from its children, and it has received a sufficient number of video packets, the peer will increase its max out-degree as follows:

$$K_{out}(p) = \min(K_{out}(p)+1, K_{out}^{max})$$

where $K_{out}^{max}$ is a pre-defined constant value to prevent the exhaustive use of the peer's resources. In an exemplary implementation, $K_{out}^{max}=20$.

On the other hand, anytime a peer receives an unsubscribe message from a child due to poor throughput, it will decrease its max out-degree as follows $$K_{out}(p) = \max(K_{out}(p)-1, 0).$$

Illustrative Processes

Figure 4:
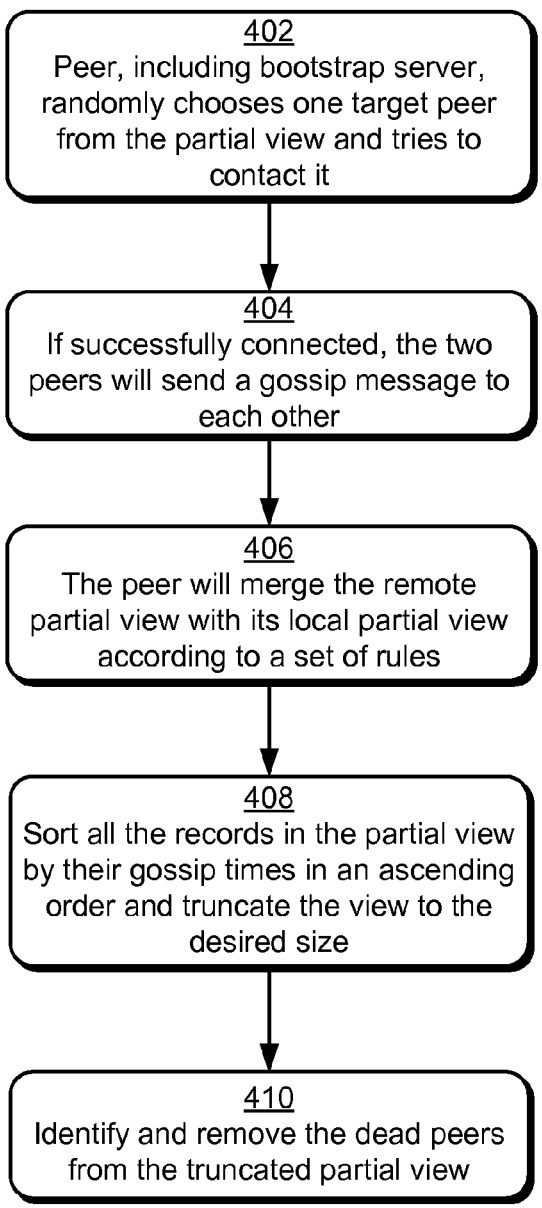
FIG. 4 depicts an illustrative process for implementing the membership protocol.

FIG. 4 depicts an illustrative process 400 for implementing the membership protocol that may be implemented by the architecture of FIG. 1 and/or by other architectures. This process 400 is illustrated as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

In operation 402, a peer, which may also include the bootstrap server, randomly chooses a target peer from its partial view and attempts to contact the target peer. As described earlier, the partial view includes peer record information for other peers in the session. If the peer and the target peer connect successfully, the two peers send a gossip message to each other in operation 404. The gossip message includes the respective partial views of each peer. In operation 406, the peer merges the remote partial view with its own partial view according to a set of rules. The rules provide that the target peer record will be added if it was not present in the originating peer's partial view. If the target peer record does exist, its sequence number will be checked to determine whether it is smaller than the existing record. If so, the existing record will be replaced with the new target peer record. Finally, if the target peer record is marked as a dead peer, the record in the originating peer will be marked as dead and the overlay will be notified.

All of the records are sorted in the partial view by their gossip times in ascending order in operation 408. If the number of records exceeds a predetermined or desired size, the partial view will be truncated and records removed to reduce the partial view to the desired size. In operation 410, the dead peers are identified and removed from the truncated partial view. Since these dead peers would have been at the end of the sort list in operation 408, they will be the first to be truncated in the event the partial view exceeds its threshold size.

Figure 5:
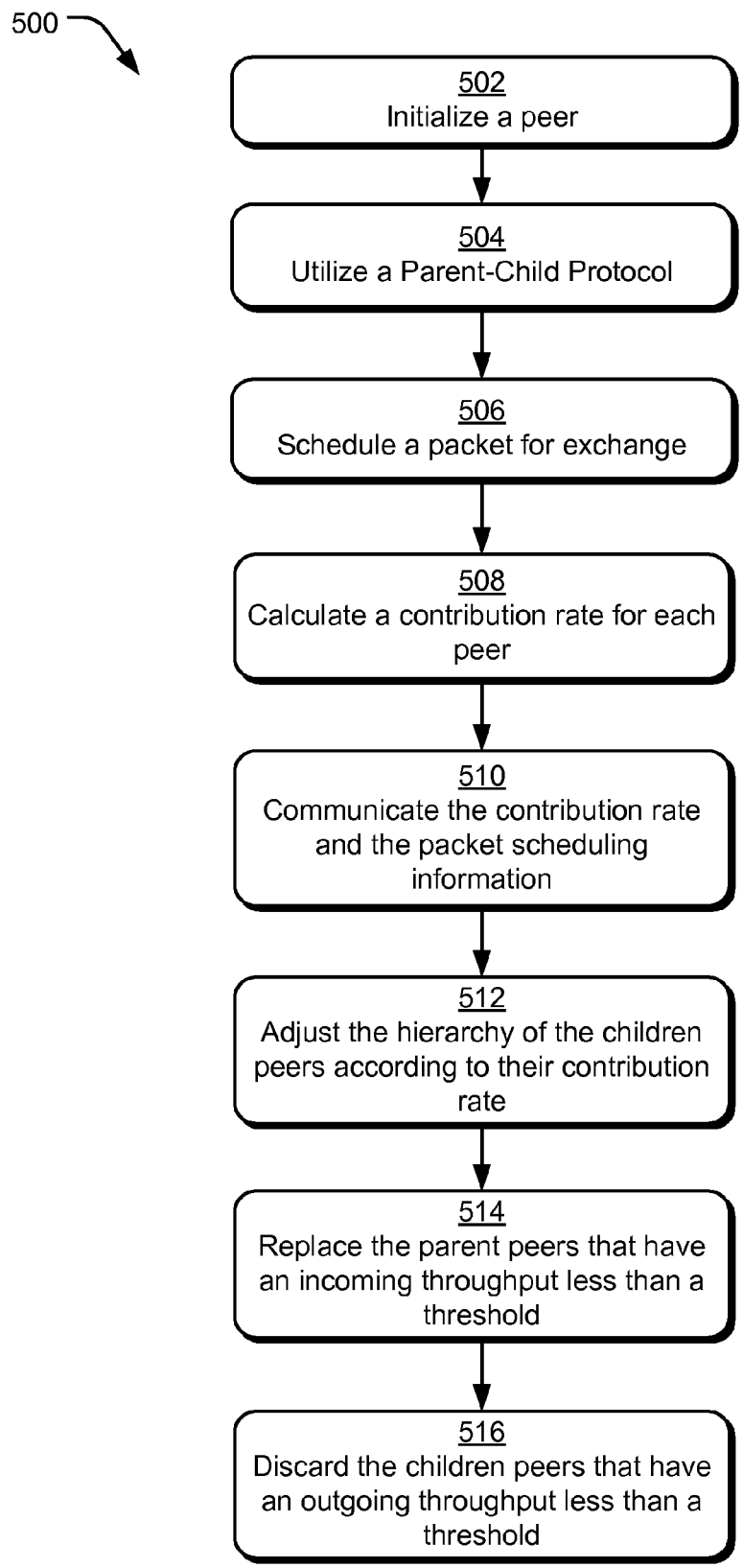
FIG. 5 depicts an illustrative process for implementing the overlay construction and optimization module.

FIG. 5 depicts an illustrative process 500 for implementing the overlay construction and optimization protocol that may be implemented by the architecture of FIG. 1 and/or by other architectures. This process 500 is illustrated as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

In operation 502, a peer is initialized. The initialization sets the in-degree, the out-degree, the initial max in-degree, the initial max out-degree and the initial hop count as described in more detail above. Operation 504 provides for the utilization of a parent-child protocol. This is an important element in the overlay construction and optimization model and provides for two peers to be parents of each other, thus greatly enhancing data flow between peers. Operation 506 schedules a packet for exchange using a pull-based method. In operation 508, a contribution rate is calculated for each peer. The contribution rate is communicated along with the packet scheduling information to the requesting peers in operation 510. The hierarchy of all of the children peers is adjusted according to the contribution rate of each of the children peers in operation 512. Operation 514 replaces the parent peers that have an incoming throughput less than a predetermined threshold. Operation 516 discards the children peers that have an outgoing throughput less than a predetermined threshold.

CONCLUSION

The description herein describes a directed graph model using a peer-to-peer (P2P) overlay structure and a gossip-based protocol to maintain the distributed membership. A protocol suite for peers to join the live streaming session, form the P2P streaming overlay, and exchange video packets with others has also been presented. The different capabilities of the heterogeneous peers are well depicted using an adaptive out-degree mechanism. The performance of the whole system is maintained by a contribution-aware mechanism which ensures that the peers with large contribution will get more chance to be served than those with small or no contribution.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A first peer computing device of a peer-to-peer architecture, the first peer computing device comprising:
   one or more processors;
   memory;
   a membership module, stored in the memory and executable on the one or more processors to:
   establish a connection between a bootstrap server and the first peer computing device, and
   exchange partial view information between the first peer computing device and the bootstrap server, the partial view information comprising: (i) peer record information that describes a current status of the first peer computing device, and (ii) a current status of the bootstrap server, wherein the peer record information that describes the current status of the first peer computing device is provided to the bootstrap server and the current status of the bootstrap server is provided to the first peer computing device, at least a first portion of the partial view information being stored in a local cache in the first peer computing device and at least a second portion of the partial view information being stored in a bootstrap cache in the bootstrap server; and
   an overlay construction and optimization module, stored in the memory and executable on the one or more processors to:
   describe a data flow in a streaming overlay of the peer-to-peer architecture, and
   enable the first peer computing device to provide at least the first portion of the partial view information to a second peer computing device of the peer-to-peer architecture and enable the second peer computing device to provide at least a third portion of the partial view information to the first peer computing device utilizing a parent-child protocol that allows for the first and second peer computing devices to be both a parent and a child of one another.

2. The device according to claim 1, wherein the overlay construction and optimization module is configured to:
   initialize the first peer computing device;
   schedule a packet for exchange between the first peer computing device and the second peer computing device;
   calculate a contribution rate for each peer computing device; and
   communicate the contribution rate and packet scheduling information to the second peer computing device for adjusting the hierarchy of the first peer computing device and the second peer computing device according to the contribution rate.

3. The device according to claim 2, wherein the overlay construction and optimization module is further configured to:
   replace a parent peer computing device that has an incoming throughput less than a threshold; and
   discard a child peer computing device that has an outgoing throughput less than a threshold.

4. The device according to claim 1, wherein the bootstrap cache records an underloaded peer computing device as a parent candidate.

5. The device according to claim 1, wherein the local cache records an underloaded peer computing device as a parent candidate.

6. The device according to claim 5, wherein the local cache records a plurality of underloaded peer computing devices and sorts the plurality of underloaded peers by a hop count in ascending order.

7. The device according to claim 6, wherein the sorted peer computing devices are selected according to the ascending order as parent candidates.

8. The device according to claim 7, wherein if more parent candidates are needed than can be provided from the local cache over a predetermined period of time, the bootstrap cache is accessed to provide additional parent candidates.

9. The device as recited in claim 3, wherein the throughput thresholds are updated throughout the process.

10. A first peer computing device of a peer-to-peer architecture comprising:
    one or more processors;
    memory;
    a directed graph content stream, wherein the first peer computing device and a second peer computing device are communicatively linked such that the first peer computing device and the second peer computing device are configured to be parents of one another to enable the directed graph content stream to be communicated bilaterally between the first peer computing device and the second peer computing device; and a membership module, stored in the memory and executable on the one or more processors to:
- establish contact between the first peer computing device and the second peer computing device, and
- exchange partial view information between the first peer computing device and the second peer computing device, the partial view information comprising:
  - (i) peer record information that describes a current status of the first peer computing device, and (ii) a current status of the second peer computing device,
- wherein the peer record information that describes the current status of the first peer computing device is provided to the second peer computing device and the current status of the second peer computing device is provided to the first peer computing device, at least a first portion of the partial view information being stored in a first local cache in the first peer computing device and at least a second portion of the partial view information being stored in a second local cache in the second peer computing device.

11. The device according to claim 10 wherein the peer record information consists of a record number, a peer ID, a network address, one or more gossip times and an overlay status.

12. The device according to claim 10 wherein the local cache records an underloaded peer as a parent candidate.

13. The device according to claim 12 wherein the first peer computing device is configured to access a bootstrap cache for parent candidate information upon joining the peer-to-peer architecture and access the local cache of the first peer computing device for parent candidate information thereafter.

14. The device according to claim 13, wherein the local cache records a plurality of underloaded peer computing devices and sorts the plurality of underloaded peer computing devices by a hop count in ascending order.

15. The device according to claim 14, wherein the first peer computing device selects the sorted peer computing devices according to the ascending order as parent candidates.

16. The device according to claim 15, wherein if more parent candidates are needed than can be provided from the local cache over a period of time, a bootstrap cache is accessed to provide the additional parent candidates.

17. A first peer computing device of a peer-to-peer architecture comprising:
- one or more processors;
- memory;
- a directed graph content stream, wherein the first peer computing device and a second peer computing device are communicatively linked such that the first peer computing device and the second peer computing device are configured to be parents of one another to enable the directed graph content stream to be communicated bilaterally between the first peer computing device and the second peer computing device; and
- an overlay construction and optimization module, stored in the memory and executable on the one or more processors to:
  - describe a data flow in a streaming overlay of the peer-to-peer architecture, and
  - enable the first peer computing device to provide at least a first portion of partial view information to the second peer computing device of the peer-to-peer architecture and enable the second peer computing device to provide at least a second portion of the partial view information to the first peer computing device utilizing a parent-child protocol that allows for the first and second peer computing devices to be both a parent and a child of one another.

18. The device according to claim 17, wherein the overlay construction and optimization module is configured to:
- initialize the first peer computing device;
- schedule a packet for exchange between the first peer computing device and the second peer computing device;
- calculate a contribution rate for each peer computing device; and
- communicate the contribution rate and packet scheduling information to the second peer computing device for adjusting the hierarchy of the first peer computing device and the second peer computing device according to the contribution rate.

19. The device according to claim 18, wherein the overlay construction and optimization module is further configured to:
- replace a parent peer computing device that has an incoming throughput less than a threshold; and
- discard a child peer computing device that has an outgoing throughput less than a threshold.

20. The device according to claim 17, wherein the packet scheduling is conducted using a pull-based method.

* * * * *